United States Patent
Shook

(10) Patent No.: US 7,318,623 B2
(45) Date of Patent: Jan. 15, 2008

(54) BICYCLE SEAT POST

(76) Inventor: William B. Shook, 3917 E. Eden Roc Cir., Tampa, FL (US) 33634

( * ) Notice: Subject to any disclaimer, the term of this patent is extended or adjusted under 35 U.S.C. 154(b) by 0 days.

(21) Appl. No.: 11/214,651

(22) Filed: Aug. 30, 2005

(65) Prior Publication Data

US 2007/0046081 A1    Mar. 1, 2007

(51) Int. Cl.
*B62J 1/00*        (2006.01)
(52) U.S. Cl. .............. 297/195.1; 297/215.15; 403/87
(58) Field of Classification Search ........... 297/195.1, 297/207, 215.13, 215.15; 248/286, 299; 280/281 R; 403/82, 87
See application file for complete search history.

(56) References Cited

U.S. PATENT DOCUMENTS

| 3,992,054 | A | * | 11/1976 | Campagnolo | .......... 297/215.15 |
| 4,440,440 | A |   | 4/1984  | Juy         |           |
| 4,502,811 | A |   | 3/1985  | Patriarca   |           |
| 4,826,192 | A |   | 5/1989  | Borromeo    |           |
| 4,983,063 | A | * | 1/1991  | Phillips    | ......................... 403/4 |
| 5,226,624 | A | * | 7/1993  | Kingsbery   | ............... 248/219.2 |
| 5,501,506 | A | * | 3/1996  | Kao         | ....................... 297/215.15 |
| 5,657,958 | A |   | 8/1997  | McLaughlin et al. |    |
| 5,664,829 | A |   | 9/1997  | Thomson et al.   |    |
| 5,988,741 | A |   | 11/1999 | Voss et al.     |    |
| 6,182,939 | B1 |  | 2/2001  | Schoepper   |           |
| 6,848,701 | B2 |  | 2/2005  | Sinyard et al. |       |
| 2006/0152045 | A1 | * | 7/2006 | Okajima et al. | ......... 297/195.1 |

* cited by examiner

*Primary Examiner*—Peter R. Brown
(74) *Attorney, Agent, or Firm*—Jason H. Foster; Kremblas, Foster, Phillips & Pollick

(57) ABSTRACT

A bicycle seat post and clamp for mounting in the seat tube of a bicycle frame and clamping to the bicycle seat rails. The seat post has a straight section to insert into the seat tube and a preferably toroidal section that is clamped by the clamp. The clamp includes a cradle with hooks at opposing ends that extend around seat rails, and a strap with hooks at opposing ends to extend around the seat rails in the opposing direction. A screw extends between two legs making up the strap for tightening the strap, thereby decreasing the size of the opening formed by the clamp, thus clamping the clamp to the seat post and the seat rails.

16 Claims, 3 Drawing Sheets

BICYCLE SEAT POST

BACKGROUND OF THE INVENTION

1. Field of the Invention

This invention relates generally to bicycles and more particularly to bicycle seat posts and mechanisms for clamping a bicycle seat to a seat post.

2. Description of the Related Art

It is well known that conventional bicycles have frames made, at least in part, of tubular material. The central tube of the typical bicycle frame, which is a hollow tube with at least the upper end open to permit insertion of a seat post, is referred to as the "seat tube". In a typical bicycle, therefore, a bicycle seat (also called a "saddle") is mounted to the top of a seat post, typically by a clamping mechanism that is attached to the upper end of the seat post, and the bottom end of the seat post is inserted into the seat tube of the frame.

Conventional seat clamping mechanisms are made of heavy metal, such as steel, in order to be strong enough to support the forces applied to the clamp by the seat rails. The substantial forces applied to the clamp arise from the common construction of bicycle seats. Standard bicycle seat rails extend from the narrow front of the seat to the wider back of the seat and are 7.0 mm diameter rods, typically made of steel or a lightweight alloy such as titanium. Each rail is held tightly about mid way along its length in the clamp to transfer the weight of the rider from the upper surface of the seat, upon which the rider sits, to the clamp, which is mounted to the seat post. The clamp must also prevent the seat from coming off the bicycle under extreme side and upwardly directed forces that can be applied to the seat. The forces applied by the rails on the seat post clamp can be enormous due to the small contact area and the substantial weight of some riders.

Conventional clamping mechanisms are also typically mounted to the seat posts by insertion to the upper end thereof. This results in a weak joint that can be broken by stresses that are often encountered on bicycle seat posts. In order to overcome these weaknesses, heavier seat posts have been used. But there is a need for less weight on bicycles, and therefore existing seat posts are not satisfactory.

BRIEF SUMMARY OF THE INVENTION

The invention is a seat post apparatus that is for mounting between a bicycle frame and a bicycle seat having seat rails. The seat post apparatus comprises a seat post clamp having a seat post encircling body defining an opening. The post encircling body is preferably made up of a cradle having a radially inwardly facing surface and a strap having a radially inwardly facing surface. The radially inwardly facing surfaces of the clamp form the opening.

Means for adjusting the opening size, such as a screw that extends between two legs of the strap, permit decreasing of the size of the opening for tightening around the seat post. At least two seat rail mounting members, such as hooks at opposing strap and cradle ends in the preferred embodiment, are mounted to the seat post encircling body.

The seat post has a first, preferably straight, section for mounting to the bicycle frame, and a curved, preferably toroidal, section extending through the opening. The curved section seats against the radially inwardly facing surfaces of the cradle and the strap. The curved section extends substantially unitarily from the first section, and the cross-sectional shape of the seat post is preferably circular, although it could be any closed shape.

The clamp tightens around the curved section of the seat post, and the components are mutually supported. The hooks also surround the seat rails, and the weight of the rider on the seat rails is transferred to the very strong toroidal section of the seat post. The weight of the entire invention is rather small, despite its immense strength, due to the mutual support provided by the preferably circular cross section seat tube and the clamp.

Figures 1, 4:
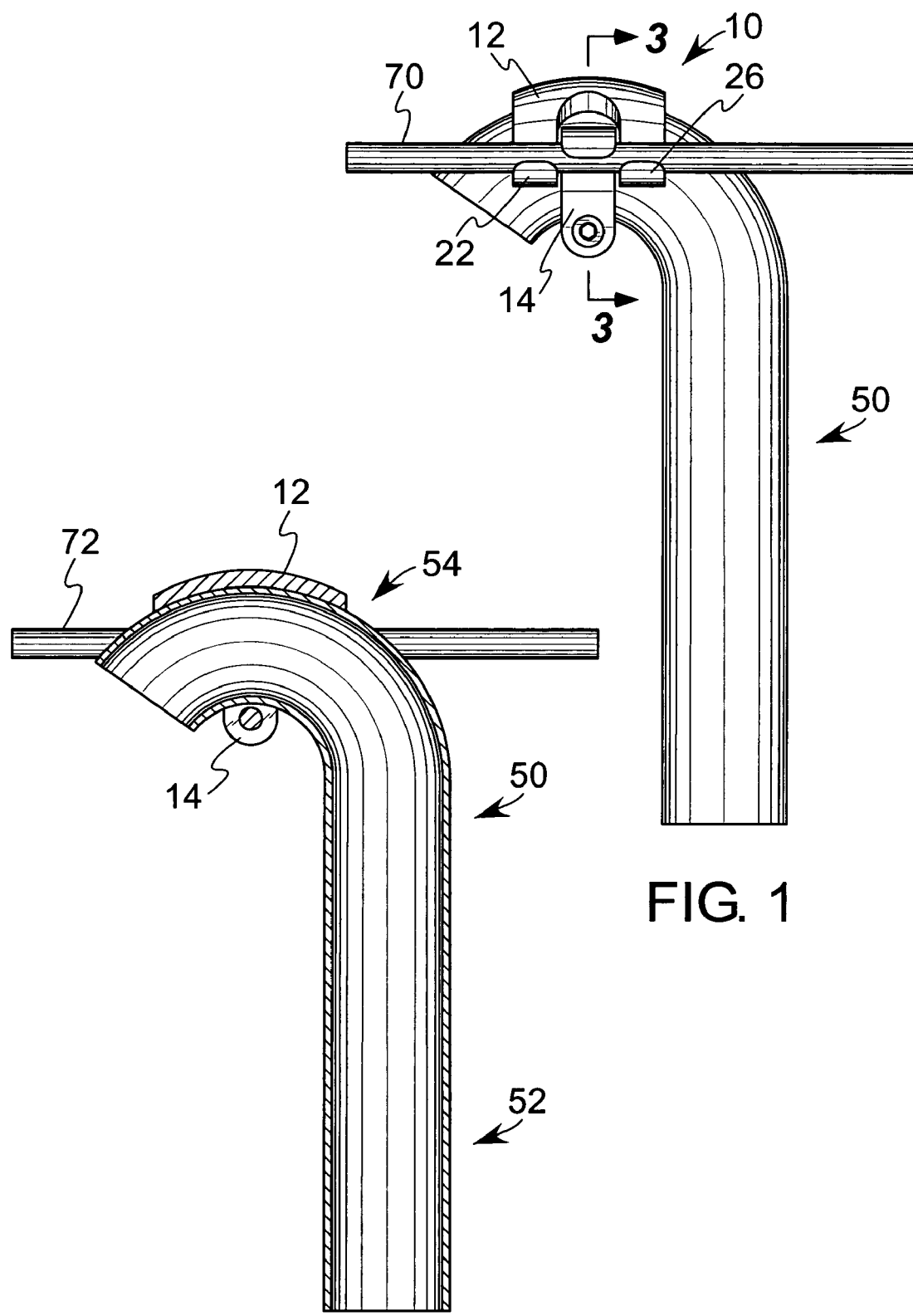
FIG. 1 is a side view illustrating a preferred embodiment of the present invention.
FIG. 4 is a side view in section illustrating the embodiment of FIG. 2 through the line 4-4.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

Figure 2:
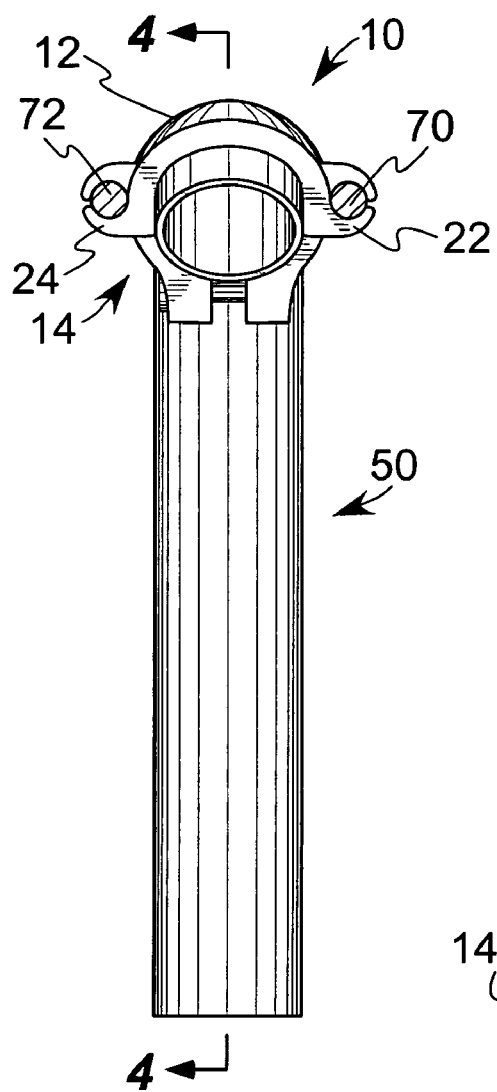
FIG. 2 is an end view illustrating the preferred embodiment of the present invention.

The invention has two major parts that are shown clearly in FIGS. 1 and 2. One major part is the clamp 10, and the other major part is the seat post 50. The seat post 50 mounts to a bicycle frame and the clamp 10 mounts to a bicycle seat, which is also known as a saddle. The clamp 10 extends around the seat post 50 and clamps tightly to the outer surface of the seat post 50 when the combination is in a condition in which it permits the bicycle to be ridden by a rider. Upon loosening, the clamp 10 can be moved relative to the seat tube 50, thereby permitting adjustment between the two, as described in more detail below.

The preferred clamp 10 is made up of two components: a cradle 12 and a strap 14, which are shown in detail in FIGS. 5-9 and 10-12. The cradle 12 has an inverted U shape, the interior portion of which has a radially inwardly facing surface 13 that contacts the radially outwardly facing exterior surface 51 of the seat tube 50. Preferably, the inwardly facing surface of the cradle 12 is shaped to conform very precisely to the outwardly facing surface of the seat post 50 so that the two surfaces contact each other over a large area, not only at a few points. This enhances the frictional resistance to relative movement once the clamp 10 is tightened to the seat post 50, and avoids the formation of pivot points that would allow one structure to rock or pivot relative to the other structure, under particularly directed forces. At least one hook, such as the seat rail retaining members 22, 24, 26 and 28, extends from each opposing end of the cradle 12 around seat rails for connecting to the seat as described in more detail below.

Figure 3:
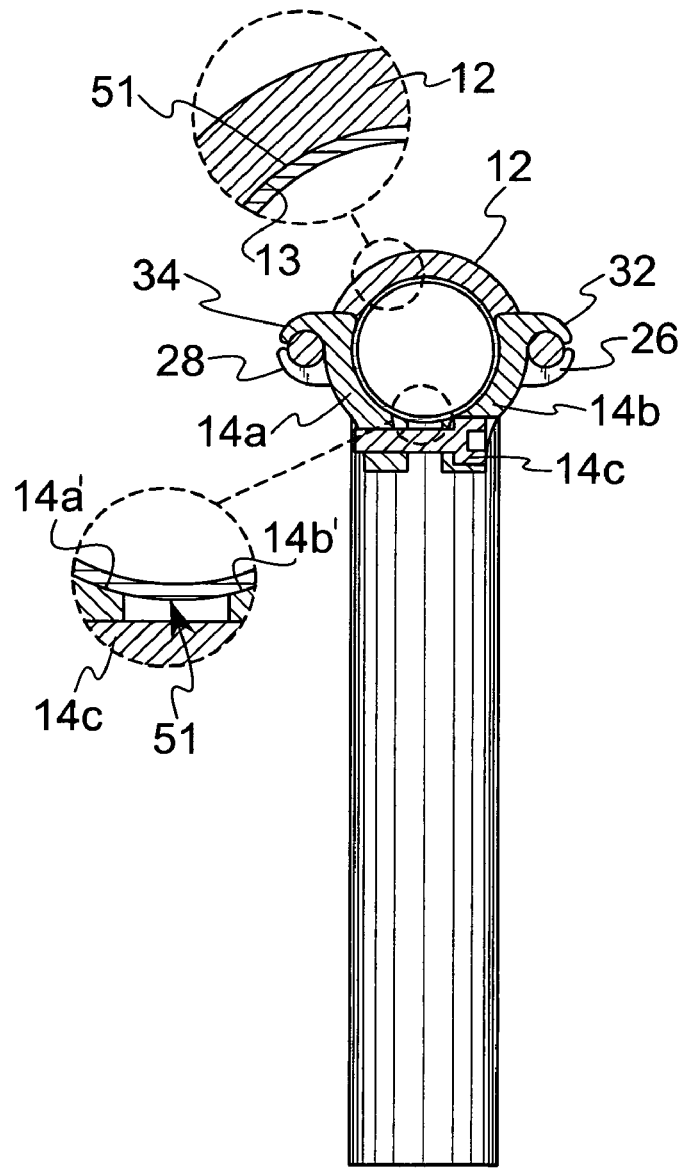
FIG. 3 is an end view in section illustrating the embodiment of FIG. 1 through the line 3-3.
Figure 5:
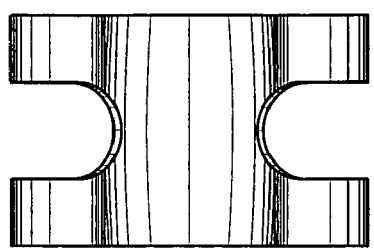
FIG. 5 is a top view illustrating the preferred cradle.
Figure 6:
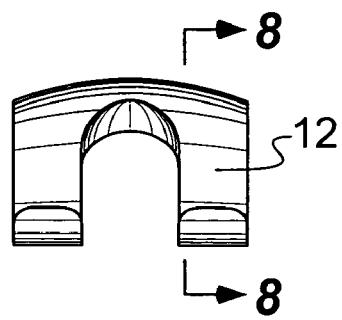
FIG. 6 is a side view illustrating the preferred cradle.
Figure 7:
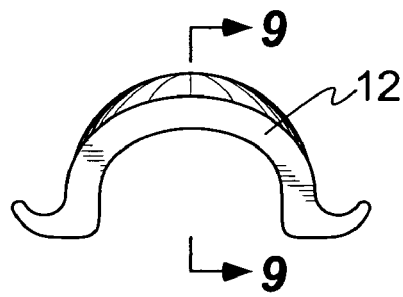
FIG. 7 is an end view illustrating the preferred cradle.
Figure 8:
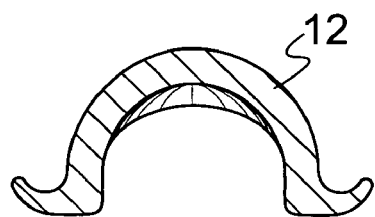
FIG. 8 is an end view in section illustrating the preferred cradle of FIG. 6 through the line 6-6.
Figure 9:
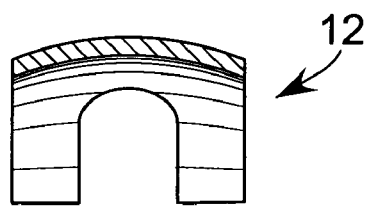
FIG. 9 is a side view in section illustrating the preferred cradle of FIG. 7 through the line 7-7.
Figure 10:
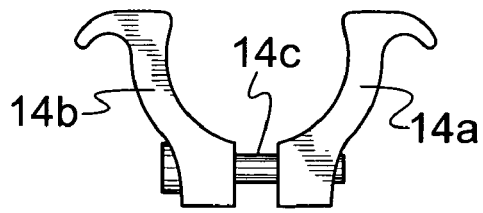
FIG. 10 is an end view illustrating the preferred strap.
Figure 11:
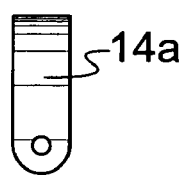
FIG. 11 is a side view illustrating a leg of the preferred strap.
Figure 12:
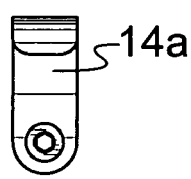
FIG. 12 is a side view illustrating a leg of the preferred strap.

The strap 14 is made up of the pair of strap legs 14a and 14b joined together by the screw 14c, as illustrated in FIGS. 3 and 10. The strap 14 forms another U-shaped component of the clamp 10, and the interior thereof has radially inwardly facing surfaces 14a' and 14b' that abut the radially outwardly facing surface 51 of the seat post 50. As with the cradle 12, there is also preferably contact between the strap 14 and the seat post 50 over a large area. The strap legs have a hook, such as the seat rail retaining members 32 and 34, at each end for extending around the seat rails as described in more detail below.

The strap and the cradle form a seat post-encircling body having an opening, defined by the radially inwardly facing surfaces of the clamp components, through which the seat post extends. This opening can be decreased or increased in diameter (or, if non-circular, opening size), such as by rotating the screw 14c, in order to tighten or loosen the clamp 10 on the seat post 50. Although the screw 14c is illustrated, it will become apparent that other means for adjusting the opening size can be substituted for the screw 14c, including conventional bicycle quick-releases, hose clamp like screw structures and any other apparatus that can reduce an opening size.

The seat post 50 is preferably a hollow tubular structure that has two sections that are preferably unitarily connected: a straight section 52 that can extend into a bicycle frame seat tube, and a curved section 54 to which the clamp 10 mounts. The curved section 54 extends unitarily from the straight section 52, which means that the straight section 52 and the curved section 54 are integral with one another and preferably have no discontinuity in the sidewall thereof, except for the change in curvature of the sidewall. The seat post 50 preferably extends from the straight section 52 to the toroidal curved section 54 with no seam, weld or other fastening structures that would form weak points. The curved section 54 preferably forms a portion of a toroid (thus, the curved section 54 is often referred to herein as "toroidal), and the cross sectional shape of the entire seat post 50, including the curved section 54, is preferably circular, although it could be other shapes, including but not limited to oval, octagonal and rectangular. Of course, the seat post could alternatively be circular with a flat region or some other combination of shapes. This is also acceptable, but not preferred, because a circular cross section results in an inherently strong seat post, and has other advantages that will be apparent to a person of ordinary skill from the description herein. The preferred curved section 54 has no apertures formed therein, which would weaken it.

Preferably, the seat post 50 is formed by simply bending an end of an aluminum tube in the shape of a portion of a toroid, while leaving the other end as close to perfectly straight as is feasible. Of course, any other material can be used, and materials, such as composites, can be molded into the final shape. A portion of the curved end is then cut off to leave an end that is flat and able to receive a cap or other closure for the seat post end opening. The amount of a toroid that remains at the curved section 54 is dependent at least upon the seat angle desired.

The seat post 50 is mounted to a bicycle frame in a conventional manner; typically by tightening a clamp around the opening at the top of the seat tube on the bicycle frame. The curved section 54 can face either the front or rear of the bicycle, depending upon the rider's preference.

The clamp 10 mounts to the bicycle seat rails 70 and 72 by extending the members 22-28 and 32-34 around the seat rails as illustrated with their openings facing toward one another to form a cylindrical passage. The curved section 54 extends through the opening in the clamp 10 when the clamp 10 is in a loosened state. As noted above, the clamp 10 has an interior surface that very closely matches the exterior surface of the curved section 54.

When the seat post section 54 is first inserted through the opening in the clamp 10, the clamp is loose enough to permit adjustments in the relative positions of the clamp 10 and the seat post 50. This can accommodate some amount of fore-and-aft movement of the clamp 10 relative to the seat post 50. The toroidal shape of the curved section 54 also permits angle adjustment by simply sliding the clamp 10 along the curved section 54 until the desired angle is accomplished. Additionally, the seat rails 70 and 72 are initially loose enough to permit the bicycle seat's fore-and-aft position to be adjusted by sliding the seat rails relative to the members 22-28 and 32-34. Thereupon, the screw 14c can be tightened to fix the seat and clamp 10 to the seat post 50.

Upon tightening of the screw 14c, the distance between the lower (in the illustrations) ends of the legs 14a and 14b decreases, thereby decreasing the diameter of the preferred substantially circular cross sectional opening formed by the cradle 12 and the strap 14. As the diameter of the opening is reduced, so are the diameters of the cylindrical passages formed between the members 22-28 and 32-34 in which the seat rails 70 and 72 are mounted. By reducing the size of the opening in the clamp 10, such as by tightening the screw 14c, the interior surfaces of the clamp 10 are tightened against the exterior surfaces of the seat post 50 to frictionally engage the seat post 50. When the clamp 10 is tightened sufficiently, the radially inwardly facing surfaces of the cradle 12 and strap 14 seat firmly against the outwardly facing surface 51 of the seat post 50 and hold the clamp 10 to the seat post 50 by frictional engagement. Similarly, although not necessarily to the same degree, the seat rails 70 and 72 are held by frictional engagement with the members 22-28 and 32-34. This thereby prevents any significant relative motion between the seat rails 70 and 72, the clamp 10 and the seat post 50. The bicycle seat is thereby fixed to the bicycle frame.

The present invention has several advantages. First, the forces on the bicycle seat are transferred to the clamp 10 and seat post 50 in a manner that takes advantage of the device's inherent strength. The members 22-28, which bear the downwardly directed load applied by the rider's weight, tend to bend inwardly upon the application of such a load. Such a force is directed radially inwardly against the toroidal curved section 54. Because of the inherent strength of the circular cross section seat post 50, this radially inwardly directed force is strongly resisted to prevent deformation or fracture of any component. The members 32 and 34 provide similar support for the seat rails and aid in supporting lateral and upwardly directed loads.

In addition to the strength of the sidewall of the seat post 50, the strength of the apparatus is enhanced by the clamp 10. The tightened clamp 10 applies a radially inwardly directed force equally around the seat post sidewall. This inwardly directed force resists any elastic deformation of the circular cross section seat post 50, due to the fact that in order to elastically deform the circular cross section seat post 50 inwardly at one region, adjacent regions would have to expand outwardly to accommodate such an inward displacement. This outward expansion is resisted by the inwardly-directed force of the clamp 10.

Furthermore, because of the advantageous combination of the clamp 10 and seat tube 50, the combined weight of the seat tube 50 and the clamp 10 is significantly smaller than conventional seat tube/clamp combinations. This arises from the ability to use lower weight materials, such as aluminum alloys, because of the decreased demands placed on each component of the clamp 10 and seat post 50. Because each of the components contributes to the strength of the seat post apparatus, the strength of each component is less critical.

Still further, the inwardly facing surface of the cradle 12 is cupped to conform to the outer surface of the curved section 54. This shape gives the cradle 12 more strength to resist bending forces that tend to push the members 22-28 closer together. If the cradle 12 were flat or only curved in one direction (e.g., in the side-to-side direction), this would not provide as much strength to resist bending as exists in the preferred embodiment where there is a curvature that resembles a portion of a sphere, although the curvature is not exactly spherical.

It is preferred that the radially inwardly facing surfaces 13 and 14a' and 14b' contact the radially outwardly facing surface 51 of the seat tube continuously and without any substantial gaps. This provides the best support for the seat tube and the clamp under stresses. In order to provide the best contact between the clamp 10 and the seat tube 50, the radially inwardly facing surface 13 of the cradle 12 preferably has a slightly smaller radius of curvature (in the direction of the length of the curved section 54) than the radially outwardly facing surface 51 where the two contact. This very slight deviation ensures that the edges of the cradle 12 are seated against the seat post, and no "rocking" of the clamp 10 relative to the seat post 50 can occur. Although this is not required if the radii of the two match perfectly, it may be more feasible taking into consideration typical manufacturing tolerances.

Figure 13:
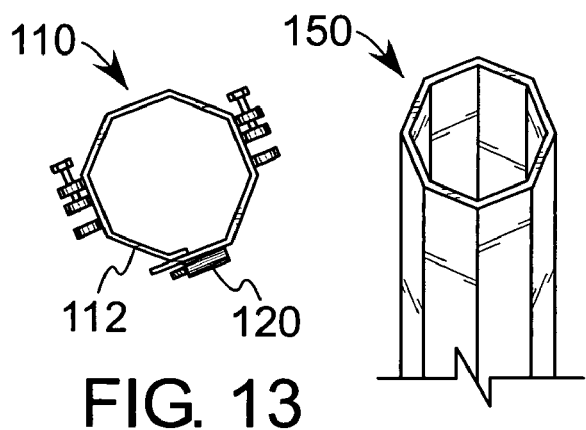
FIG. 13 is an end view illustrating an alternative embodiment of a clamp.
Figure 14:
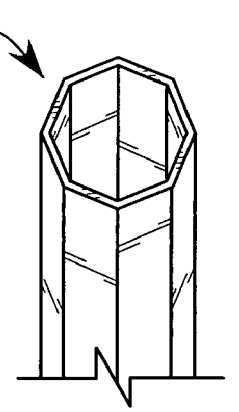
FIG. 14 is an end view illustrating an alternative embodiment of a seat post.

As noted above, there are other shapes and configurations of seat posts and clamps that can be used according to the invention. For example, in FIG. 14, a seat post 150 is shown having a cross sectional shape that is octagonal rather than circular, as in the preferred embodiment. Similarly, in FIG. 13, the clamp 110 is shown that is for mounting around the octagonal seat post 150. The clamp 110 has an octagonal shape and an alternative means for adjusting the opening size of the clamp 110. A screw 120 is mounted to one end of the clamp band 112 and threads through laterally-oriented slits in the other end of the band 112 in the manner of a hose clamp. Thus, by rotating the screw 120, the size of the opening in the clamp 110 is adjusted.

While certain preferred embodiments of the present invention have been disclosed in detail, it is to be understood that various modifications may be adopted without departing from the spirit of the invention or scope of the following claims.

The invention claimed is:

1. A seat post apparatus for mounting between a bicycle frame and a bicycle seat which has seat rails, the apparatus comprising:
    (a) a seat post clamp having a seat post encircling body defining a seat post opening, the encircling body having at least one adjustable gap;
    (b) at least two seat rail mounting members, each mounting member being at an end of the seat post encircling body to form a first and a second seat rail opening through which said seat rails extend;
    (c) means for adjusting the size of exactly one of said at least one adjustable gap and thereby simultaneously adjusting the seat post opening size and the first and second seat rail opening sizes; and
    (d) a seat post having a first section for mounting to the bicycle frame, and a curved section extending through the seat post opening and seating against the radially inwardly facing surfaces of the encircling body.

2. The apparatus in accordance with claim 1, wherein the curved section is toroidal, and the toroidal section is integral formed with the first section.

3. The apparatus in accordance with claim 2, wherein the toroidal section has a substantially octagonal cross section.

4. The seat post apparatus in accordance with claim 1, wherein means for adjusting further comprises at least one bolt threaded through the seat post encircling body across the gap for adjusting the size of the opening.

5. The seat post apparatus in accordance with claim 4, wherein said at least one bolt has an axis that is substantially perpendicular to the forces exerted by the mounting members on the seat rails.

6. The seat post apparatus in accordance with claim 4, wherein said at least one bolt is exactly one bolt.

7. The seat post apparatus in accordance with claim 1, wherein the curved section is toroidal and has a substantially non-circular cross section.

8. A seat post apparatus for mounting between a bicycle frame and a bicycle seat which has seat rails, the apparatus comprising:
    (a) a seat post clamp having a seat post encircling body defining an opening;
    (b) means for adjusting the opening size;
    (c) at least two seat rail mounting members, each mounting member being at an end of the seat post encircling body; and
    (d) a seat post having a first section for mounting to the bicycle frame, and a curved section extending through the opening and seating against radially inwardly facing surfaces of the seat post encircling body;
    wherein the seat post encircling body further comprises:
        a cradle having a radially inwardly facing surface, and wherein said seat rail mounting members further comprise at least one cradle hook at a first cradle end and at least one cradle hook at a second cradle end, said cradle hooks opening substantially oppositely to the cradle's radially inwardly facing surface.

9. The apparatus in accordance with claim 8, wherein the seat post encircling body further comprises a strap having a radially inwardly facing surface that, in combination with the radially inwardly facing surface of the cradle, defines said opening, and wherein said seat rail mounting members further comprise at least one strap hook at a first strap end and at least one strap hook at a second strap end, said strap hooks opening substantially oppositely to the strap's radially inwardly facing surface.

10. The apparatus in accordance with claim 9, wherein the cradle hooks open substantially oppositely to the strap hooks.

11. The seat post apparatus in accordance with claim 9, wherein the strap further comprises a pair of strap legs.

12. The seat post apparatus in accordance with claim 11, wherein the surfaces of the cradle and strap leg hooks contact circumferentially overlapping sections of the seat post's outer surface for resisting bending of the hooks.

13. The seat post apparatus in accordance with claim 9, wherein the first cradle end has two spaced hooks forming a gap into which the hook at the first strap end extends, and the second cradle end has two spaced hooks forming a gap into which the hook at the second strap end extends.

14. The seat post apparatus in accordance with claim 11 wherein the first cradle end has two spaced hooks forming a gap into which the hook at the first strap end extends, and the second cradle end has two spaced hooks forming a gap into which the hook at the second strap end extends.

15. The seat post apparatus in accordance with claim 8, wherein the curved section is toroidal and has a substantially non-circular cross section.

16. A seat post apparatus for mounting between a bicycle frame and a bicycle seat which has at least a first and a second seat rail, the apparatus comprising:

(a) a seat post clamp including a cradle and an encircling body component, each of which has a radially inwardly facing surface defining an opening;

(b) means for adjusting the opening size;

(c) a seat post having a first section for mounting to the bicycle frame, and a curved section extending through the opening and seating its outer surface against radially inwardly facing surfaces of the cradle and encircling body component;

(d) a first hook at a first end of the cradle, the first hook having a surface in contact with the outer surface of the seat post;

(e) a second hook at a second end of the cradle, the second hook having a surface in contact with the outer surface of the seat post;

(f) a third hook at a first end of the encircling body component, the third hook having a surface in contact with the outer surface of the seat post;

(g) a fourth hook at a second end of the encircling body component, the fourth hook having a surface in contact with the outer surface of the seat post;

wherein the surfaces of the cradle and encircling body component hooks contact circumferentially overlapping sections of the seat post's outer surface for resisting bending of the hooks.

* * * * *